United States Patent Office  3,131,184
Patented Apr. 28, 1964

3,131,184
DERIVATIVES OF 7-AMINOCEPHALO-
SPORANIC ACID
Alfred W. Chow, Merchantville, N.J., and John R. E.
Hoover, Glenside, Pa., assignors to Smith Kline &
French Laboratories, Philadelphia, Pa., a corporation
of Pennsylvania
No Drawing. Filed Dec. 27, 1961, Ser. No. 162,573
15 Claims. (Cl. 260—243)

This invention pertains to novel compounds possessing valuable chemotherapeutic activity and more specifically to a new class of compound demonstrating important antimicrobial properties.

This application is a continuation-in-part of our co-pending application Serial No. 113,981, filed May 3, 1961, now abandoned.

In particular, the compounds of this invention not only demonstrate a high level of antimicrobial activity against those micro-organisms showing a susceptibility to the penicillin-type antibiotics, but in addition exhibit certain other properties which increase their value as chemotherapeutic agents. Specifically these compounds demonstrate a high resistance to antibiotic destroying enzymes such as penicillinase. Accordingly these compounds maintain their antimicrobial activity for a greater period of time than heretofore observed for many known antibiotics of related structures. This property of penicillinase-resistance is manifested by both an improved stability to a purified preparation of this enzyme and more importantly by antimicrobial activity against certain microorganisms which are presumably resistant to the known penicillins because of their ability to produce the enzyme penicillinase, such as for example, the so-called "penicillin-resistant" strains of *Staphylococcus aureus*. These compounds are also active against other organisms such as *Micrococcus pyogenes*, *Proteus vulgaris*, and *Diplococcus pneumoniae*.

While not of the penicillin structure, these compounds are useful in the treatment of microbial infections which heretofore have been resistant to penicillin therapy as well as microbial infection which have been susceptible to known penicillins. The administration of these compounds to the infected host may be accomplished in any of the usual forms, such as for example, solutions, suspensions, creams, ointments, tablets, capsules, and the like, and are suitable for oral, injectable, or topical application, depending upon the nature of the particular infection.

The compounds of the present invention may be represented by the following structural formula:

$$X-\overset{O}{\underset{\|}{C}}-NH-CH-\overset{S}{\underset{|}{CH}}\diagdown CH_2$$
$$O=C-N-C-CH_2-A$$
$$\diagdown C \diagup$$
$$\overset{|}{C}OOM$$

(I)

wherein A is hydrogen, hydroxyl, lower alkanoyloxy, benzoyloxy, pyridinium, or when taken together with M, a monovalent carbon-oxygen bond; M is hydrogen, pharmaceutically acceptable non-toxic cations, an anionic charge when A represents pyridinium, or when taken together with A, a monovalent carbon-oxygen bond; and X is a benzo-heterocyclic nucleus having the structure:

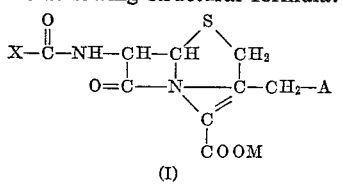

or

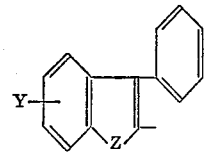

wherein Z is $$\diagdown O \diagup, \diagdown S \diagup \text{ or } \diagdown \underset{H}{N} \diagup$$

and Y is hydrogen, halogen, lower alkyl, lower alkoxy or nitro.

In those instances where A is pyridinium, the cationic charge on this group is matched by the anionic charge of the carboxylic acid radical, the entire molecule being of a Zwitterionic nature and M is thus an anionic charge. A can also represent hydroxyl or the lower alkanoic acid esters thereof of from 1 to 6 carbon atoms. A is also benzoyloxy including the closely related substituted analogs thereof. The hydroxyl group embraced by A can alternatively be internally esterified with the carboxylic acid radical thereby forming a lactone ring as represented when A and M taken together comprise a monovalent carbon-oxygen bond. In addition, A can be hydrogen so as to thereby form a methyl group.

Also embraced within the scope of the present invention are the non-toxic pharmaceutically acceptable salts of the above carboxylic acid radical. The cations comprised in these salts and embraced by M include for example, the non-toxic metal cations as for instance the sodium ion, potassium ion, calcium ion as well as the organic amine cations, such as the lower alkyl amine cations (e.g., triethylamine), N-ethylpyridine, procaine, and the like.

The group designated by Y may be hydrogen, halogen such as chloro, bromo, fluoro or iodo, lower alkyl such as methyl, ethyl, propyl, isopropyl and the like, lower alkoxy such as methoxy, ethoxy, propoxy, and the like, or nitro.

When employed in respect to this invention, the terms lower alkyl, lower alkanoyl, lower alkoxy and the like, refer to groups comprising straight or branched hydrocarbon chains of from 1 to 4 carbon atoms.

The compounds of our invention are derivatives of thianaphthene, benzofuran and indole carboxylic acid derivatives in which a phenyl group is in either of the 2 or 3 position, the carboxy group being attached to the other. The compounds of the invention are prepared by treating a compound of the formula:

$$H_2N-CH-\overset{S}{\underset{|}{CH}}\diagdown CH_2$$
$$O=C-N \diagup C-CH_2A'$$
$$\diagdown C \diagup$$
$$\overset{|}{C}OOM$$

(II)

wherein A' is hydrogen, acetoxy, pyridinium, or taken together with M a monovalent carbon oxygen bond, with the acid chloride of a carboxylic acid having the formula:

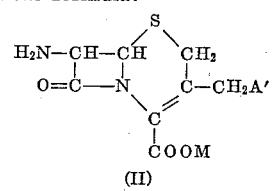

wherein Y and Z are as herein above defined.

Alternatively a mixed anhydride of the above acids may be employed in place of the above acid chlorides. We have found however, that better yields and increased purity of the product are generally obtained when the acid chlorides are employed.

The starting materials whose structures are represented by Formula II include for example, 7-amino-cephalosporanic acid and related derivatives of 7-aminocephalosporanic acid. This heterocyclic compound, 7-aminocephalosporanic acid, can be prepared from the antibiotic substance Cephalosporin C whose physical and antimicrobial properties are known to the art and whose structure is represented by the structural formula:

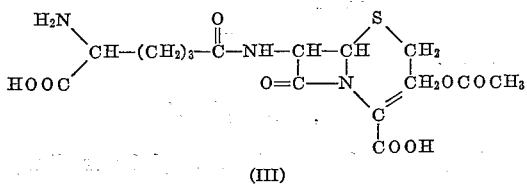

(III)

Upon hydrolysis of Cephalosporin C, as for example acid hydrolysis, there is formed α-aminoadipic acid and 7-aminocephalosporanic acid whose structure may be represented by the formula:

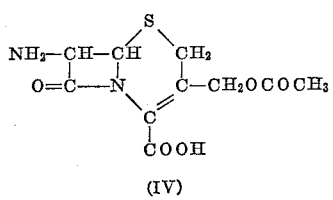

(IV)

In addition to the formation of 7-aminocephalosporanic acid upon the acid hydrolysis of Cephalosporin C, there is also further formed by hydrolysis of the acetyloxy grouping and subsequent internal esterification, the lactone having the formula:

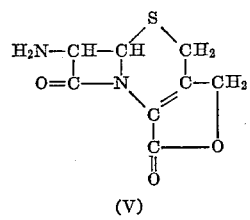

(V)

These two products designated by Formula IV and Formula V are described in Belgian Patent #593,777 and are readily separated by virtue of the different physical properties, as for example, by chromatographic techniques.

It has been further possible to modify the structure of 7-aminocephalosporanic acid by enzymatic cleavage of the acetyloxy grouping without subsequent lactone formations. There is thus formed the compound 3-hydroxymethyl-7-aminodecephalosporanic acid represented by the formula:

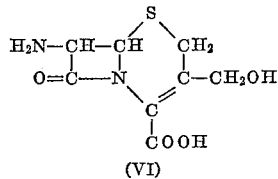

(VI)

The designation "decephalosporanic acid" is herein employed for purposes of nomenclature only and intended to represent the basic heterocyclic acid nucleus having the formula:

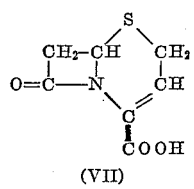

(VII)

The cleavage of the acetyloxy grouping to form 3-hydroxymethyl-7-aminodecephalosporanic acid without subsequent lactone formations may be accomplished by employing enzymatic means, as for example, by the action of an acetylesterase. Such suitable enzyme preparations may be obtained for example, from citrus fruits such as oranges, grapefruit, lemons and the like, as described by Jansen et al., Arch. Biochem. 15, 415 (1947). Preparations of such an enzyme advantageously effect hydrolysis of the acetyloxy side chain without subsequent lactone formation. The resultant hydroxy group may then be further modified as by re-esterification with a lower alkanoic acid radical so as to form the lower alkanoate esters homologous to the acetate ester present in the naturally occurring Cephalosporin C or with a benzoic acid radical so as to obtain the corresponding benzoic acid esters.

Treatment of Cephalosporin C with a tertiary base such as for example, pyridine, quinoline, or collidine prior to acid hydrolytic cleavage of the aminoadipic acid side chain forms a quaternary salt derivative of Cephalosporin C which when hydrolyzed yields a nucleus which, in the case of pyridine, has been assigned the name, 3-pyridiniummethyl-7-aminodecephalosporanic acid inner salt and the structure:

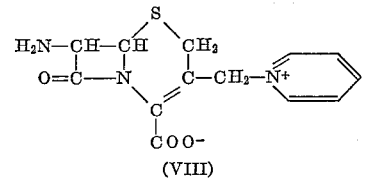

(VIII)

Reduction of Cephalosporin C with, for example, palladium-on-carbon, followed by hydrolysis or reduction of 7-aminocephalosporanic acid yields a nucleus wherein A is hydrogen. This compound has been assigned the name, 3-methyl-7-aminodecephalosporanic acid and the structure:

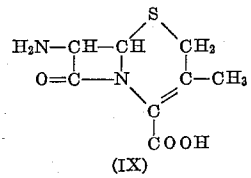

(IX)

The following examples will further serve to typify the nature of this invention, but are not to be construed as limiting the scope thereof, the scope being defined only by the appended claims.

*Example 1*

3-phenylthianaphthene-2-carboxylic acid (5.1 g., 0.02 mole) is allowed to react with 11 ml. of thionyl chloride at room temperature overnight. The resulting solution is evaporated in vacuo at 35° C. and to the oil so obtained is added 25 ml. of benzene and the mixture then re-evaporated. After adding an additional 25 ml. of benzene and repeating the evaporation, the residual oil comprising 3-phenylthianaphthene-2-carboxyl chloride is held under vacuum to remove any traces of thionyl chloride.

7-aminocephalosporanic acid is prepared from Cephalosporin C according to the procedures described in Belgian Patent #593,777.

Two grams of 3-phenylthianaphthene-2-carboxyl chloride are dissolved in 25 ml. of acetone and this solution is then added slowly to a stirred solution of 2.72 g. (0.01 mole) of 7-aminocephalosporanic acid in 90 ml. of 3% aqueous sodium bicarbonate solution and 50 ml. of acetone. Upon completion of the addition, the mixture is allowed to attain room temperature and the stirring is continued for an additional one-half hour. The mixture is then extracted three times with portions of 30 ml. of ether and the resultant aqueous solution then adjusted to pH 2.5 by the addition of concentrated sulfuric acid. During the adjustment the temperature is maintained at a level below 10°. Upon reaching pH 2.5 the solution is extracted with 25 ml. of butyl acetate followed by two additional extractions of 10 ml. The butyl acetate extracts are washed once with water and an additional 25 ml. of water are then added and the pH adjusted to 8.0 by the addition of solid potassium bicarbonate with agitation. The aqueous layer is separated, filtered and adjusted to pH 2.0 by the addition of concentrated sulfuric acid at a temperature below 10°. The resultant acidic aqueous mixture is in turn extracted twice with 20 ml. of butyl acetate, washed once with water and dried over sodium sulfate. To the dried butyl acetate solution is added with vigorous stirring a solution of potassium hydroxide in n-butanol (40 g./l.) until the pH of the reaction mixture is 8.4. The mixture is cooled until crystallization occurs and the crystals so formed are collected by centrifugation, washed with a small amount of acetone and dried. The dried crystals are dissolved in a minimum quantity of acetone:water (9:1) and precipitated by the addition of anhydrous acetone. These crystals are collected and dried to yield 7-(3-phenylthianaphthene-2-carboxyamido)-cephalosporanic acid as the potassium salt.

Treatment of an aqueous solution of the potassium salt with hydrogen chloride and extraction with ether then yields the free acid 7-(3-phenylthianaphthene-2-carboxyamido)-cephalosporanic acid.

In a similar fashion, 3-phenyl-5-chlorothianaphthene-2-carboxylic acid (5.76 g.) and 3-phenyl-5-nitrothianapthene-2-carboxylic acid (5.98 g.) are substituted for 3-phenylthianaphthene-2-carboxylic acid in the procedure of this example. There are thus obtained the compounds 7-(3 - phenyl - 5 - chlorothianaphthene - 2 - carboxyamido)-cephalosporanic acid and 7-(3-phenyl-5-nitrothianaphthene-2-carboxyamido)-cephalosporanic acid.

*Example 2*

To 56.7 g. (0.27 mole) of 2-phenylthianaphthene, 73 g. of anhydrous sodium acetate and 380 cc. of chloroform is added in a dropwise fashion to a solution of 28 ml. (0.56 mole) of bromine in 70 ml. of chloroform with intermittent cooling. Stirring is continued for one hour and 100 ml. of water are then added. The layers are separated and the organic layer washed first with 200 ml. of water and the 100 ml. of 5% aqueous sodium chloride solution. The mixture is filtered and dried over sodium sulfate. The dried solution is evaporated under reduced pressure to remove the solvent and distilled in vacuo to yield 2-phenyl-3-bromothianaphthene.

To 2.43 g. (0.1 mole) of magnesium turnings in 10 ml. of ether is added in a dropwise fashion with stirring, a solution of 26.9 g. (0.093 mole) of 2-phenyl-3-bromo-thianaphthene at such a rate as to maintain a vigorous reaction. At the end of the addition period, the mixture is refluxed for ½ hour and cooled to room temperature. Fifty milliliters of benzene are added and the mixture cooled in an ice-salt bath to a temperature below 0° C. A capillary tube is inserted and dry carbon dioxide gas is introduced thereby with stirring. The rate of addition is regulated so as to maintain the temperature below 0° C. Upon cessation of reaction, 25% sulfuric acid is slowly added with cooling until no further reaction takes place. The aqueous layer is extracted with ether and these ethereal extracts combined with the benzene layer obtained above. The combined organic extracts are then extracted with 3 portions of 25% aqueous sodium hydroxide. These basic extracts are in turn acidified with 50% sulfuric acid and the solid thus formed collected by filtration, washed with water and dried to yield 2-phenylthianaphthene-3-carboxylic acid.

Following the procedure of Example 1, 2-phenylthianaphthene-3-carboxylic acid is then converted to the acid chloride and this acid chloride employed to acylate 7-aminocephalosporanic acid. There is thus obtained the compound 7 - (2-phenylthianaphthene-3-carboxyamido)-cephalosporanic acid.

By employing equivalent quantities of 2-phenyl-6-methoxythianaphthene and 2-phenyl-5,6-dimethoxythianaphthene in the initial procedures of this example the corresponding carboxylic acids are prepared. These acids are then converted to their acid chlorides which in turn are employed to acylate 7-aminocephalosporanic acid according to the procedure of Example 1. There are thus obtained the compounds 7-(2-phenyl-6-methoxythianaphthene-3-carboxyamido)-cephalosporanic acid and 7-(2-phenyl - 5,6 - dimethoxythianaphthene - 3-carboxyamido)-cephalosporanic acid.

*Example 3*

A. Phenylpyruvic acid is treated with phenylhydrazine according to standard procedures to yield the phenylhydrazone of phenylpyruvic acid. Eleven grams of this phenylhydrazone are heated at reflux in 72 ml. of absolute ethanol and 8 ml. of concentrated sulfuric acid for 1 hour. At the end of this time, the solution is cooled and the excess acid neutralized by the addition of aqueous sodium bicarbonate. The excess ethanol is then evaporated under reduced pressure and the residue taken up in 150 ml. of ether. This ethereal solution is washed with 10% aqueous sodium bicarbonate and then with water. The washed ethereal solution is dried over sodium sulfate and the ether then evaporated under reduced pressure to yield the ethyl 3-phenylindole-2-carboxylate which is employed in the next step without further purification.

A mixture of 6.6 g. (0.025 mole) of ethyl 3-phenylindole-2-carboxylate in 2.1 g. (0.037 mole) of potassium hydroxide, 10 ml. of water and 65 ml. of methanol is refluxed for 1½ hours. At the end of this time, the methanol is removed by distillation and 40 ml. of water are added. The solution is then acidified to Congo red with concentrated sulfuric acid and the solid which forms is collected by filtration, washed with water, and dried to yield 3-phenylindole-2-carboxylic acid.

B. To 9.45 g. (0.04 mole) of 3-phenylindole-2-carboxylic acid is added 25 ml. of thionyl chloride in 50 ml. of anhydrous ether. The solution is allowed to stand for 40 minutes at room temperature and the resulting solution then evaporated below 35° C. To the residual oil so obtained is added 50 ml. of benzene and the mixture re-evaporated below 35° C. An additional 50 ml. of benzene are then added and the evaporation repeated. The residual oil is held vacuum to remove any traces of thionyl chloride.

3-phenylindole-2-carboxyl chloride (2 g.) is dissolved in 25 ml. of acetone. This solution is cooled and then added slowly with stirring to 2.72 g. of 7-aminocephalosporanic acid in 90 ml. of 3% aqeuous sodium bicarbonate solution and 50 ml. of acetone. The mixture is allowed to reach room temperature while stirring is continued for an additional 30 minutes. The mixture is extracted three times with ether and adjusted to pH 2.5 keeping the temperature below 10° C. The solution is then extracted three times with butyl acetyl and these extracts washed with water. Additional water is added and the pH adjusted to 8.0 by the addition of potassium bicarbonate. The aqueous layer is filtered and the pH adjusted to 2.0 at a temperature below 10° C. This solution is then extracted with butyl acetate and these organic extracts washed with water and dried over sodium sulfate. A solution of potassium hydroxide in n-butanol (40 g./l.) is added until pH is 8.4. The mixture is then cooled and the solid which forms collected by centrifugation, washed with a small amount of acetone and dried to yield 7-(3-phenylindole-2-carboxyamido)-cephalosporanic acid as the potassium salt.

In a similar manner by employing 2-phenylindole-3-carboxylic acid in place of 3-phenylindole-2-carboxylic acid in the procedure of part B of this example, there is obtained 7 - (2-phenylindole-3-carboxyamido)-cephalosporanic acid.

*Example 4*

By substituting 2-phenylbenzofuran-3-carboxylic acid for 3-phenylthianaphthene-2-carboxylic acid in the procedure of Example 1, there is obtained the compound 7 - (2 - phenylbenzofuran-3-carboxyamido)-cephalosporanic acid.

Similarly employing an equivalent amount of 3-phenylindole-2-carboxylic acid in this procedure there is obtained 7 - (3-phenylindole-2-carboxyamido)-cephalosporanic acid.

Likewise there are obtained according to the procedures of Example 1 from 3-phenyl-5-methylbenzofuran-2-carboxylic acid and 2-phenyl-5-methoxybenzofuran-3-carboxylic acid, the compounds 7-(3-phenyl-5-methyl-benzofuran-2-carboxyamido)-cephalosporanic acid and 7-(2-phenyl - 5-methoxybenzofuran-3-carboxyamido)-cephalosporanic acid.

Example 5

3-hydroxymethyl-7-aminodecephalosporanic acid lactone is prepared from Cephalosporin C according to the procedures described in Belgian Patent #593,777. This compound (2.28 g.) is then treated with the acid chloride of 3-phenylthianaphthene-7-carboxylic acid according to the procedure of Example 1. The reaction mixture is then extracted with butyl acetate and these organic extracts then concentrated to a residue comprising 3-hydroxymethyl - 7 - (3 - phenylthianaphthene-2-carboxyamido)-decephalosporanic acid lactone which is further purified by recrystallization from ether.

In a similar fashion 2-phenylthianaphthene-3-carboxylic acid, 3-phenylindole-2-carboxylic acid, 2-phenylindole-3-carboxylic acid, 3-phenylbenzofuran-2-carboxylic acid and 2-phenylbenzofuran-3-carboxylic acid are employed in the form of their acid chlorides as the acylating agents obtaining the compounds:

3-hydroxymethyl-7-(2-phenylthianaphthene-3-carboxyamido)-decephalosporanic acid lactone,
3-hydroxymethyl-7-(3-phenylindole-2-carboxyamido)-decephalosporanic acid lactone,
3-hydroxymethyl-7-(2-phenylindole-3-carboxyamido)-decephalosporanic acid lactone,
3-hydroxymethyl-7-(3-phenylbenzofuran-2-carboxyamido)-decephalosporanic acid lactone, and
3-hydroxymethyl-7-(2-phenylbenzofuran-3-carboxyamido)-decephalosporanic acid lactone.

Example 6

One gram of Cephalosporin C as the sodium salt is dissolved in 50 ml. of water. There is then added sufficient Dowex 50 (X8) resin as the hydrogen form to adjust the pH to 2.6. The resin is removed by filtration and to the filtrate is added 3.8 ml. of pyridine, to pH rising to approximately 6.5. The solution is maintained in a glass container at 37° C. for 48 hours. At the end of this time, the solution is freezed dried and the residue triturated twice with 50 ml. of acetone and redried. The solid is then dissolved in 10 ml. of water and introduced onto a Dowex 1 (X10) acetate column (2 cm. x 10 cm.). The column is eluted with water and 10 ml. fractions are collected. Fractions 2 through 4 are then combined and freezed dried, and the residue stirred with acetone and dried to yield the pyridinium inner salt of desacetyl Cephalosporin C.

Four grams of the pyridinium inner salt of desacetyl Cephalosporin C are dissolved in 60 ml. of water and the pH adjusted to 2.5 by the addition of the acid form of Dowex 50 (X8). The resin is filtered and washed with 20 ml. of water and to the combined filtrate and washings are added 20.5 ml. of 0.1 N hydrochloric acid. The mixture is allowed to stand for 72 hours at 20° C. and at the end of this time, introduced onto a column of Dowex-1 (as the acetate form), 2 cm. x 10 cm. The initial percolate is collected in 10 ml. fractions and upon the collection of the twelfth fractions the column is eluted with water until a total of 34 fractions have been collected. The initial 15 fractions are concentrated in vacuo to yield 3-pyridiniumethyl-7-aminodecephalosporanic acid inner salt.

3-pyridiniummethyl-7-aminodecephalosporanic acid inner salt is substituted for 7-aminocephalosporanic acid in the initial procedure of Example 1 and upon completion of the reaction period, the reaction mixture is extracted with ether and concentrated in vacuo to a residue which when recrystallized from ethanol, yields 3-pyridiniummethyl - 7-(3-phenylthianaphthene-2-carboxyamido)-decephalosporanic acid inner salt.

By employing the suitable phenylheterocyclic carboxyl chlorides, the following compounds may thus be prepared: 3-pyridiniummethyl-7-(2-phenylthianaphthene-3-carboxyamido)-decephalosporanic acid inner salt, 3-pyridiniummethyl - 7-(3-phenylindole-2-carboxyamido)-decephalosporanic acid inner salt, 3-pyridiniummethyl-7-(2-phenylindole - 3-carboxyamido)-decephalosporanic acid inner salt, 3-pyridiniummethyl-7-(3-phenylbenzofuran-2-carboxyamido)-decephalosporanic acid inner salt, 3-pyridiniummethyl - 7-(2-phenylbenzofuran-3-carboxyamido)-decephalosporanic acid inner salt.

Example 7

A preparation of acetylesterase obtained from the peels of 72 oranges according to the procedure of Jansen et al., Arch. Biochem. 15, 415 (1947), is added to 1 g. of 7 - (3-phenylthianaphthene-2-carboxyamido)-cephalosporanic acid dissolved in 15 ml. of water. The pH 1 is adjusted to 6 and maintained at or above this level for 15 hours. At the end of this time, the solution is passed through an IR 4B column (in the acetate form) and eluted with aqueous 0.1 M acetic acid which has been adjusted to pH 5.5 by the addition of pyridine. The solutions collected by development of the column are adjusted to pH 8 by the addition of sodium hydroxide and this alkaline mixture is evaporated in vacuo to yield 3-hydroxymethyl-7-(3-phenylthianaphthene-2-carboxyamido)-decephalosporanic acid as the sodium salt.

To 1 g. of 3-hydroxymethyl-7-(3-phenylthianaphthene-2-carboxyamido)-decephalosporanic acid in 10 ml. of collidine are added 15 ml. of propionyl chloride. The mixture is allowed to stand for 10 hours and at the end of this time, poured into 25 ml. of ice water. The solid which is thus formed is collected by filtration, recrystallized from dimethylformamide and dried to yield 3-propionyloxymethyl - 7 - (3-phenylthianaphthene-2-carboxyamido)-decephalosporanic acid. In a similar fashion other lower alkanoyl chlorides such as butanoyl chloride or pentanoyl chloride may be employed in place of propionyl chloride obtaining the corresponding compounds, 3 - butanoyloxy-7-(3-phenylthianaphthene-2-carboxyamido)-decephalosporanic acid and 3-pentanoyloxymethyl - 7-(3-phenylthianaphthene-2-carboxyamido)-decephalosporanic acid.

In an analogous fashion benzoyl chloride is employed in the place of these lower alkanoyl chlorides and it is thus obtained 3-benzoyloxymethyl-7-(3-phenylthianaphthene-2-carboxyamido)-decephalosporanic acid.

By substituting 7 - (2-phenylthianaphthene-3-carboxyamido)-cephalosporanic acid and 7-(3-phenylindole-2-carboxyamido)-cephalosporanic acid and 7-(3-phenylbenzofuran-2-carboxyamido)-cephalosporanic acid, there are respectively obtained upon subjecting them to the present example the compounds 3-propionyloxymethyl-7-(2-phenylthianaphthene - 2 - carboxyamido)-decephalosporanic acid; 3-propionyloxymethyl-7-(3-phenylindole-2-carboxyamido)-cephalosporanic acid and 3-propionyloxymethyl - 7-(3-phenylbenzofuran-2-carboxyamido)-decephalosporanic acid.

In a similar manner by employing benzoyl chloride, the corresponding benzoate esters of the above compounds are prepared. Alternatively substituted benzoyl chloride may be prepared as for example, p-chlorobenzoyl chloride to obtain the correspondingly substituted benzoate esters.

Example 8

Cephalosporin C sodium salt dihydrate (0.75 g.) in sufficient water to effect dissolution is added to an aqueous suspension of 2.0 g. of 10% palladium-on-carbon in 30 ml. of water which has been previously saturated with hydrogen. The mixture is hydrogenated with agitation at one atmosphere pressure of 1 hour.

The catalyst is removed by centrifugation and the supernatant is preserved. The catalyst is then extracted with 80% aqueous methanol at pH 8, and these extracts then adjusted to pH 6 by the addition of hydrochloric acid. The extract is evaporated to a small volume and added to the original reaction solution. The combined solution is then brought to pH 6 with sodium hydroxide and lyophilized to yield the product as the sodium salt.

The product obtained (0.3 g.) is dissolved in 7 ml. of water containing 0.25 g. of anhydrous sodium bicarbonate. To this stirred solution is added 0.25 g. of 1-fluoro-2,4-dinitrobenzene in 7 ml. of ethyl alcohol. The mixture is stirred in the dark at room temperature for 2½ hours. The pH of the solution is then adjusted to 5 by the addition of concentrated hydrochloric acid and the alcohol is removed under reduced pressure.

The mixture is adjusted to pH 7 by the addition of sodium bicarbonate and extracted with ether to remove excess 1-fluoro-2,4-dinitrobenzene yielding a clear aqueous solution. The pH is adjusted to 2.5 by the addition of concentrated hydrochloric acid and extracted several times with ethyl acetate. These ethyl acetate extracts are washed with water, dried over anhydrous sodium sulfate and evaporated to a residue.

The solid obtained (1 g.) is dissolved in 10 ml. of acetonitrile and 10 ml. of N-hydrochloric acid. This solution is stored in the dark at 37° C. under nitrogen for 64 hours.

At the end of this time, 20 ml. of water are added to this solution and the solution then extracted five times with 10 ml. portions of ethyl acetate. The residual solution is then brought to pH 6 with 1 N sodium hydroxide, and added to a column of Dowex 1 (X8) (acetate form, 3 cm. x 5 cm.). When all the solution has been introduced onto the column, the column is washed with 60 ml. of water and then the product eluted with 2 N acetic acid. Lyophilization of the acetic acid eluate yields the product, 3-methyl-7-aminodecephalosporanic acid as a solid.

Example 9

3-methyl-7-aminodecephalosporanic acid (2.16 g.) is substituted for 7-aminocephalosporanic acid in the procedure of Example 1. Upon completion of the steps therein described, there is obtained the compounds 3-methyl-7-(3 - phenylthianaphthene-2 - carboxyamido)-decephalosporanic acid.

In a similar fashion by employing 3-methyl-7-aminodecephalosporanic acid in the subsequent procedures of Example 1, the following compounds are prepared: 3-methyl-7-(3-phenyl - 5-chlorothianaphthene-2 - carboxyamido)-decephalosporanic acid, 3-methyl-7-(2-phenylthianaphthene-3-carboxyamido)-decephalosporanic acid, 3-methyl-7-(3-phenylindole - 2-carboxyamido)-decephalosporanic acid, 3-methyl - 7-(2-phenylindole-3 - carboxyamido)-decephalosporanic acid, 3-methyl-7-(3-phenylbenzofuran-2-carboxyamido)-decephalosporanic acid and 3-methyl - 7-(2 - phenylbenzofuran - 3 - carboxyamido)-decephalosporanic acid.

Example 10

One gram of 7-(2-phenylthianaphthene-3-carboxyamido)-cephalosporanic acid is dissolved in excess amyl acetate and to the solution is added 10 g. of N-ethylpiperidine. The solution is stirred for 30 minutes and the crystals formed upon standing are collected by filtration and dried to yield the N-ethylpiperidine salt of 7-(2-phenylthianaphthene-3-carboxyamido)-cephalosporanic acid.

Example 11

One gram of 7-(3-phenylthianaphthene-2-carboxyamido)-cephalosporanic acid is dissolved in excess amyl acetate and to the solution is added 10 g. of triethylamine. The solution is stirred for 30 minutes and the crystals which form upon standing are collected by filtration and dried to yield the triethylamine salt of 7-(3-phenylthianaphthene-2-carboxyamido)-cephalosporanic acid.

What we claim is:
1. Compounds of the formula:

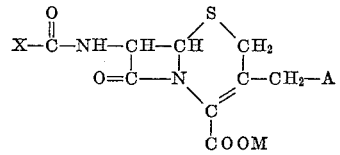

wherein
A is a member selected from the group consisting of hydrogen, hydroxyl, lower alkanoyloxy, benzoyloxy, pyridinium, and when taken together with M, a monovalent carbon-oxygen bond;
M is the cation form of a member selected from the group consisting of hydrogen, sodium, potassium, calcium, lower alkyl amine and procaine, an anionic charge when A is pyridinium, and when taken together with A, a monovalent carbon-oxygen bond;
and X is an aromatic nucleus having a structure selected from the group consisting of:

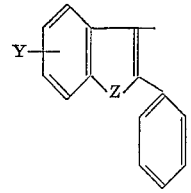

and

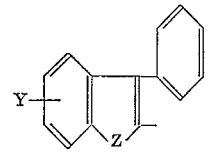

wherein
Z is a member selected from the group consisting of $$\diagdown S \diagup, \diagdown O \diagup \text{ and } \diagdown \underset{H}{N} \diagup$$

and
Y is a member selected from the group consisting of hydrogen, halogen, lower alkyl, lower alkoxy, and nitro.

2. A compound of the formula:

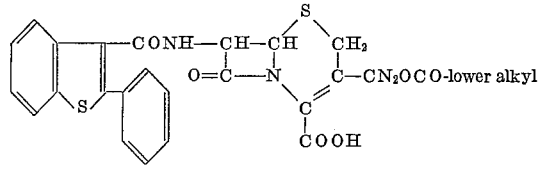

3. A compound of the formula:

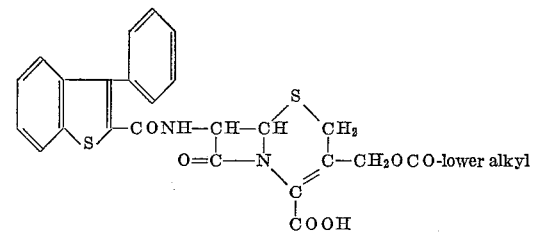

4. A compound of the formula:

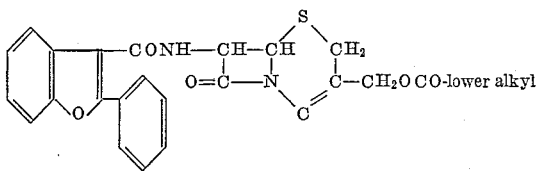

5. A compound of the formula:

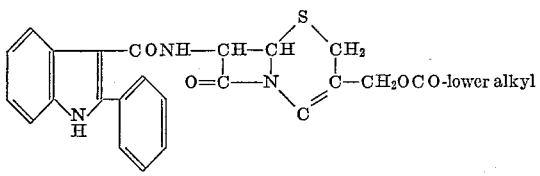

6. 7-(2-phenylthianaphthene-3-carboxyamido)-cephalosporanic acid.

7. 7-(3-phenylthianaphthene-2-carboxyamido)-cephalosporanic acid.

8. 3 - pyridiniummethyl - 7-(2 - phenylthianaphthene-3-carboxyamido)-decephalosporanic acid inner salt.

9. 3-pyridiniummethyl - 7(3 - phenylthianaphthene-2-carboxyamido)-decephalosporanic acid inner salt.

10. 3-benzoyloxymethyl - 7(2 - phenylthianaphthene-3-carboxyamido)-decephalosporanic acid.

11. 3 - benzoyloxymethyl - 7(3 - phenylthianaphthene-2-carboxyamido)-decephalosporanic acid.

12. 3 - methyl - 7(2 - phenylthianapthene - 3 - carboxyamido)-decephalosporanic acid.

13. 3 - methyl - 7-(3-phenylthianaphthene - 2-carboxyamido)-decephalosporanic acid.

14. 3 - pyridiniummethyl - 7-(2 - phenylbenzofuran - 3-carboxyamido)-decephalosporanic acid inner salt.

15. 3 - pyridiniummethyl-7-(3 - phenylbenzofuran - 2-carboxyamido)-decephalosporanic acid inner salt.

No references cited.